US008412362B2

(12) United States Patent
Yeager et al.

(10) Patent No.: US 8,412,362 B2
(45) Date of Patent: Apr. 2, 2013

(54) VISUAL CONTROL PROCESS FOR VALVE GATES

(75) Inventors: Dorne Yeager, Maple City, MI (US); Lance Roman, Empire, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 0 days.

(21) Appl. No.: 13/351,011

(22) Filed: Jan. 16, 2012

(65) Prior Publication Data

US 2012/0119419 A1 May 17, 2012

Related U.S. Application Data

(63) Continuation of application No. 12/317,067, filed on Dec. 18, 2008, now Pat. No. 8,121,710.

(51) Int. Cl.
| | |
|---|---|
| G05B 11/01 | (2006.01) |
| G05B 15/00 | (2006.01) |
| G06F 7/66 | (2006.01) |
| G06F 19/00 | (2011.01) |
| G06F 3/00 | (2006.01) |
| B29C 39/00 | (2006.01) |
| B29C 45/00 | (2006.01) |

(52) U.S. Cl. ............ 700/83; 700/17; 700/196; 700/197; 700/200; 700/204; 715/700

(58) Field of Classification Search .......... 700/17, 700/83, 197, 200, 204; 715/700; 264/40.3, 264/40.7; 425/145, 564
See application file for complete search history.

(56) References Cited

U.S. PATENT DOCUMENTS

| | | | | |
|---|---|---|---|---|
| 4,952,908 | A * | 8/1990 | Sanner | 340/429 |
| 5,005,116 | A * | 4/1991 | Fujita et al. | 700/83 |
| 5,191,539 | A * | 3/1993 | Harada et al. | 700/196 |
| 5,195,029 | A * | 3/1993 | Murai et al. | 700/79 |
| 5,229,952 | A * | 7/1993 | Galloway et al. | 700/200 |
| 5,316,707 | A * | 5/1994 | Stanciu et al. | 264/40.1 |
| 5,325,287 | A * | 6/1994 | Spahr et al. | 700/17 |
| 5,818,450 | A * | 10/1998 | Katsuta | 715/840 |
| 5,898,591 | A * | 4/1999 | Hettinga et al. | 700/204 |
| 6,338,004 | B1 * | 1/2002 | Usui | 700/200 |
| 6,618,041 | B2 * | 9/2003 | Nishizawa | 345/173 |
| 6,720,952 | B1 * | 4/2004 | Takizawa et al. | 345/173 |
| 6,866,496 | B2 * | 3/2005 | Morita et al. | 425/145 |
| 7,031,800 | B2 * | 4/2006 | Bulgrin | 700/200 |
| 8,165,714 | B2 * | 4/2012 | Mier et al. | 700/197 |
| 2004/0047935 | A1 * | 3/2004 | Moss et al. | 425/145 |
| 2004/0047942 | A1 * | 3/2004 | Vasapoli et al. | 425/564 |
| 2007/0273060 | A1 * | 11/2007 | Doyle et al. | 264/40.7 |
| 2009/0089697 | A1 * | 4/2009 | Loucks | 715/771 |
| 2011/0184550 | A1 * | 7/2011 | Mier et al. | 700/202 |

* cited by examiner

Primary Examiner — Ronald Hartman, Jr.
(74) Attorney, Agent, or Firm — Warn Partners, P.C.

(57) ABSTRACT

The present invention is a system for electronically controlling the movement of a pin assembly used in a valve gate mechanism of an injection molding machine. The system of the present invention includes at least one valve which is part of an injection molding machine, as well as a graphical user interface which is operable for controlling the injection molding machine and the valve. Additionally, the present invention also includes controlling the injection molding machine electronically for improving the control over the opening and closing of the valves.

26 Claims, 11 Drawing Sheets

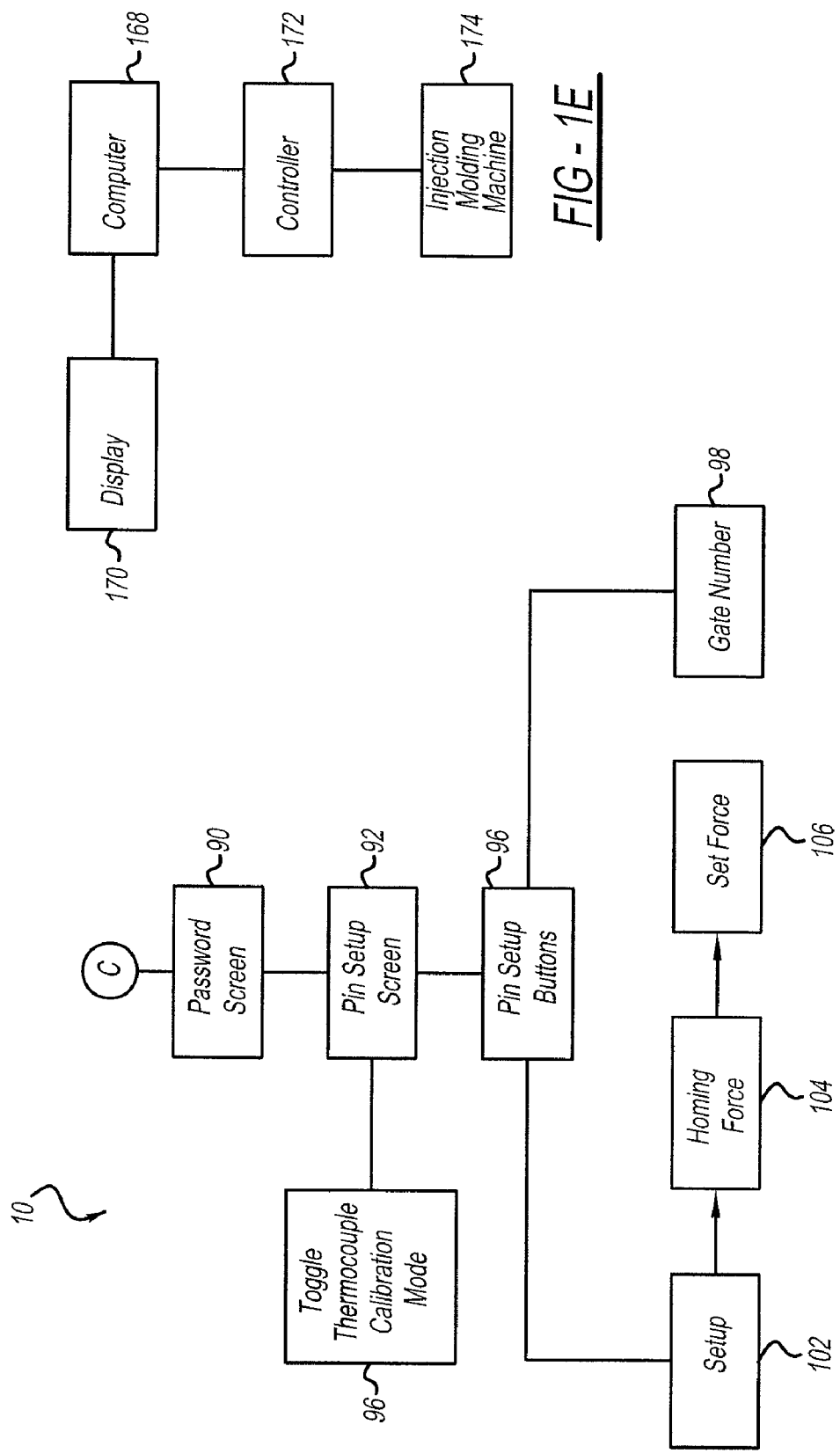

VISUAL CONTROL PROCESS FOR VALVE GATES

FIELD OF THE INVENTION

The present invention relates to a graphical user interface for electronically controlling a valve in an injection molding machine.

BACKGROUND OF THE INVENTION

Injection molding machines are generally known. Typical injection molding machines use hydraulic control methods for opening and closing various types of valves, commonly referred to as gates, or valve gates, which are opened and closed at particular times for allowing a molten material to flow into a mold. Injection molding machines typically have a mold, or cavity, which is used with the gates, with the gates being placed in various positions relative to the mold, for facilitating the flow of molten material into the mold. Each of the valve gates can be set up to open and close at specific times measured from the initial start-up of the machine to properly allow for the molten material to flow into different parts of the mold, or at different points during the operation of the machine as the position of the machine changes, creating the desired part.

The location of the molten material being injected into the mold and the time duration of injecting the molten material, both have an effect on the outcome of the part. However, the valve gates are typically controlled through the use of a hydraulic control which does not allow for a precise opening and closing of each of the valve gates. When hydraulic control is used, each of the valve gates can only be placed in either a fully open or fully closed position. With the advancement of the different types of materials used in injection molding machines and the increase in complexity of the parts produced by injection molding machines, it is desirable to have greater control over the valve gates, allowing the valve gates to have various positions other than being fully open or fully closed.

Accordingly, there exists a need for an injection molding machine having an electronic control which allows for improved control over the movement of various valve gates.

SUMMARY OF THE INVENTION

The present invention is a system for electronically controlling the movement of a pin assembly used in a valve gate of an injection molding machine. The system of the present invention includes at least one valve which is part of an injection molding machine, as well as a graphical user interface which is operable for controlling the injection molding machine and the valve. Additionally, the present invention also includes controlling the injection molding machine electronically for improving the control over the opening and closing of the valves.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1D is another portion of a flow chart of a graphical user interface for an injection molding machine having electronic control, according to the present invention;

FIG. 1E is a schematic of a system incorporating a graphic user interface used for controlling an injection molding machine, according to the present invention;

DETAILED DESCRIPTION OF THE PREFERRED EMBODIMENTS

Figure 1A:
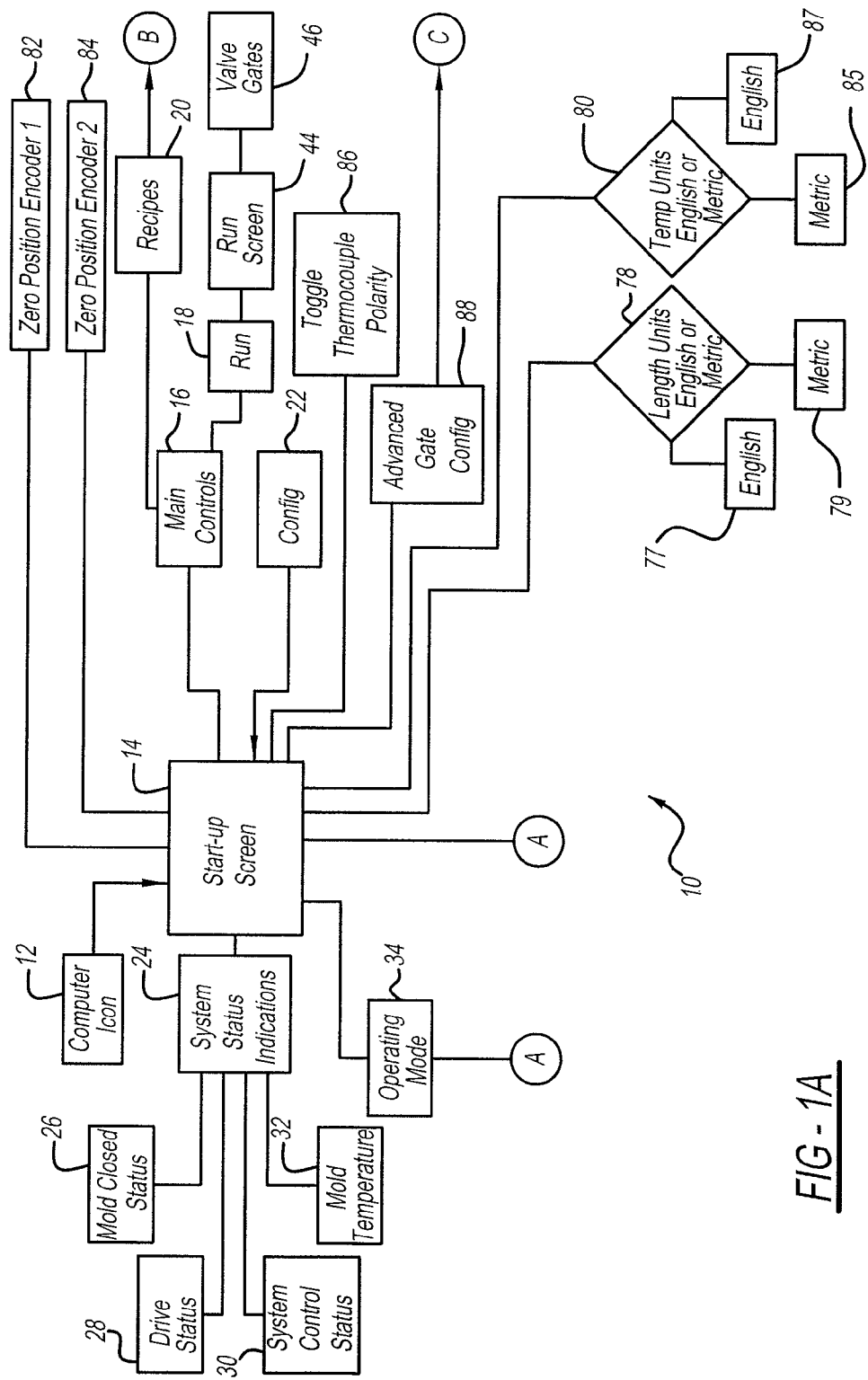
FIG. 1A is a portion of a flow chart of a graphical user interface for an injection molding machine having electronic control, according to the present invention.
Figure 1B:
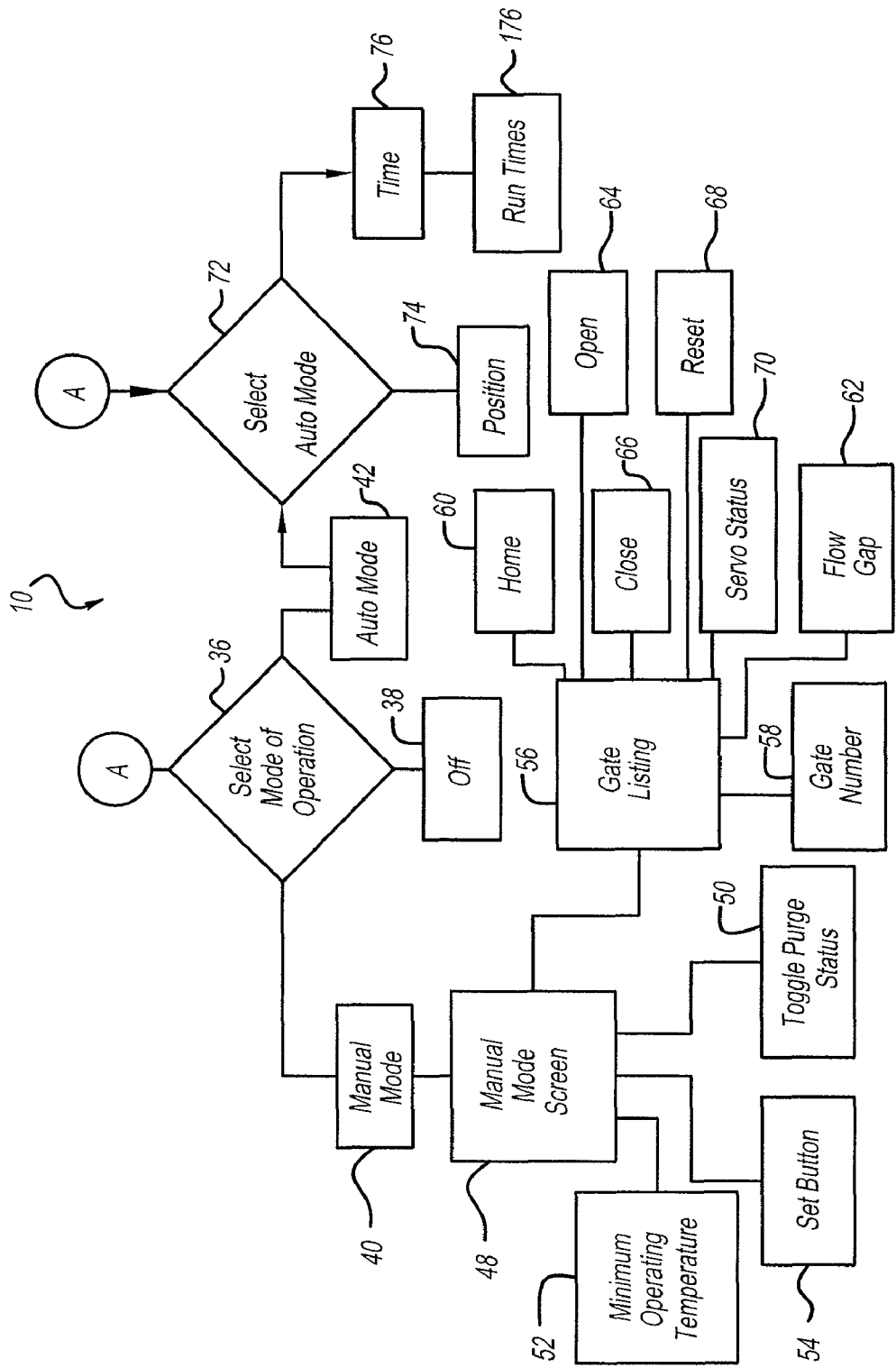
FIG. 1B is another portion of a schematic of a graphical user interface for an injection molding machine having electronic control, according to the present invention.
Figure 1C:
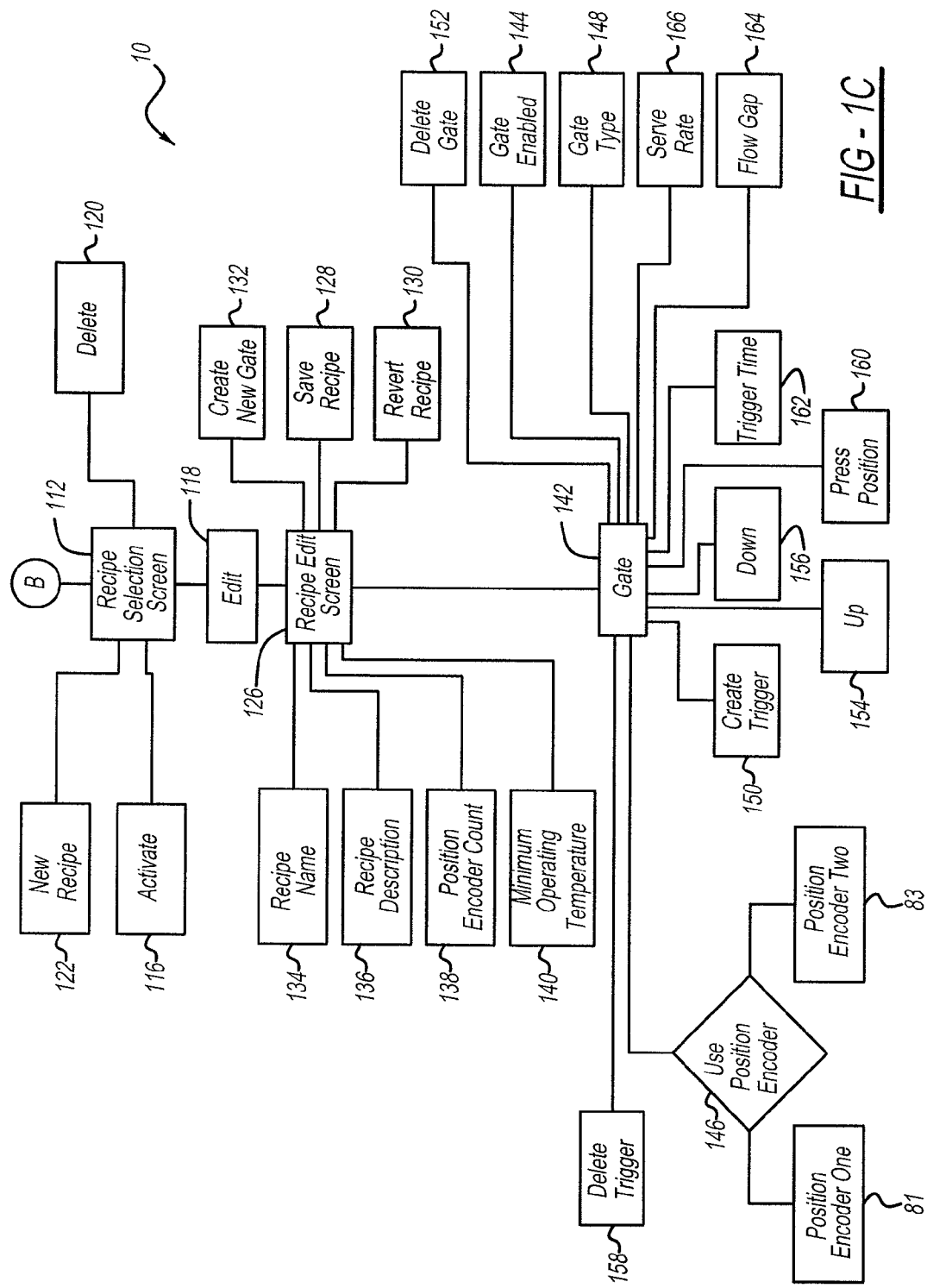
FIG. 1C is another portion of a flow chart of a graphical user interface for an injection molding machine having electronic control, according to the present invention.

The following description of the preferred embodiment(s) is merely exemplary in nature and is in no way intended to limit the invention, its application, or uses.

The present invention is directed toward a visual control process used for valve gates, in which the system provides electronic control from one to twenty-four valve gates used in an injection molding machine.

The control process of the present invention also includes various control parameters which are used for controlling the position of a pin used in a valve gate assembly. The present invention incorporates the use of a touchscreen display, where a symbol representing each valve that is being controlled is shown on the screen, and the symbol is simply touched to access the various parameters for controlling the valve. Some of the parameters are press position, trigger time, and flow gap. The press position and trigger time are used separately from one another, i.e., if the press position parameter is used, the trigger time is not used, and vice versa. Additionally, the present invention also incorporates the use of electronic control over the valve gate assembly, as opposed to hydraulic control. The use of electronic control provides increased control over the movement of the valve gate, allowing for more precise control of the flow of molten material in the injection molding machine.

The present invention can be practiced in conjunction with the Internet, World Wide Web, intranets, extranets, electronic media (e.g., CD/DVD-based systems), or the like. The system of the present invention is a web-based server that runs on an embedded Windows CE platform. The web-based server system can be accessed via a client web browser over an Ethernet-based Land Area Network (LAN) from any computer capable of running Internet Explorer or compatible Browser. A local touch screen is also available. The web-based server is a convenient and cost effective method for displaying zone status, logging data, storing recipes, and setting zone and system parameters.

In order to fully appreciate the benefits and features of the visual control process for valve gates of the present invention, it is assumed that an individual practicing the present invention will have: access to a computer (and is conversant with the basic functions thereof); an Internet service provider ("ISP") (e.g., AOL, JUNO, or the like) with e-mail capability; a Web browser (e.g., INTERNET EXPLORER, NETSCAPE, or the like); any required plug-ins (e.g., FLASH, SHOCKWAVE, JAVA VIRTUAL MACHINE, or the like); and have the ability to navigate successfully to any given uniform resource locator ("URL"). In order to further appreciate the benefits and features of the present invention, the user will also have an understanding of injection molding systems and valve gates. Valve gates are devices used for facilitating the delivery of a molten material into a mold of an injection molding machine; a valve gate typically includes a pin which is moved to open and close the gate. Injection molding machines typically include a source of molten material, which then flows through various channels, ports, and the like, into a mold; the valve gates allow the molten material to flow into the mold when the gates are open, and prevent the molten material from flowing in to the mold when the gates are closed. Each gate has a servo drive and a servo motor, and a servo valve. The servo valve is another term used to describe the pin, the servo drive is the electronics used to control the pin, and the servo motor is the device which mechanically moves the pin.

An example of an injection molding system having valve gates is discussed in co-pending application Ser. No. 11/888,584, the entire application of which in incorporated herein by reference.

A flow chart demonstrating the use of a system for the visual control process of valve gates, according to the present invention, is shown in FIGS. 1A-1D generally at 10. The first step is for the user to activate the visual control process system 10 of the present invention, e.g., by clicking on an icon or the like on a computer. The present invention incorporates the use of a touch screen, which is used for navigating the system 10 of the present invention. By way of a non-limiting example, a user could navigate to the URL of a main Web Site 12 that contains the visual control process system 10 of the present invention (e.g., with the aid of a Web browser, such as INTERNET EXPLORER, NETSCAPE, or the like).

Referring to the Figures generally, from the main Web Site 12, the user will arrive at the Startup Screen 14. The Startup Screen 14 has three main controls generally shown at 16, the "Run" button 18, the "Recipes" button 20, and the "ConFIG." button 22. Anytime the user presses the Config button 22, the user will access the Startup Screen 14. Anytime the user presses the "Run" control button 18, graphic displays of each of the valve gates will appear, the function of which will be described later. The Recipes button 20 is what is used for accessing recipes. Recipes are used for defining what parameters will be used for controlling the movements of the gates; one or more recipes can be used, with each having different parameters. Since the system 10 operates through the use of a touch screen, a user simply touches the Run Button 18, the Recipes Button 20 or the Config Button 22, as well as any other buttons used in the operation of the system 10.

Along the top of the Startup Screen 14 are four system status indicators, shown generally at 24. The system status indicators 24 include the Mold Closed Status 26, Drive Status 28, System Control Status 30, and Mold Temperature 32. Any one of the system status indicators 24 will prevent the system 10 from running if their status is not operational. In the present embodiment, the system status indicators 24 will appear having white lettering on a green background with the status is ready to run, or black lettering on a gray background when their status will prevent the system from running.

One of the parameters controlled by the user is the operating mode 34. The operating mode 34 in this embodiment is a drop down menu where one of three different modes of operation are selected; this is shown in FIG. 1A at step 36. The three different modes are "Off Mode" 38, "Manual Mode" 40, and "Auto Mode" 42. In the Off Mode 38, the system becomes idle, in Manual Mode 40, the system 10 is controlled with the buttons on the manual mode screen (which will be described later).

Figure 3:
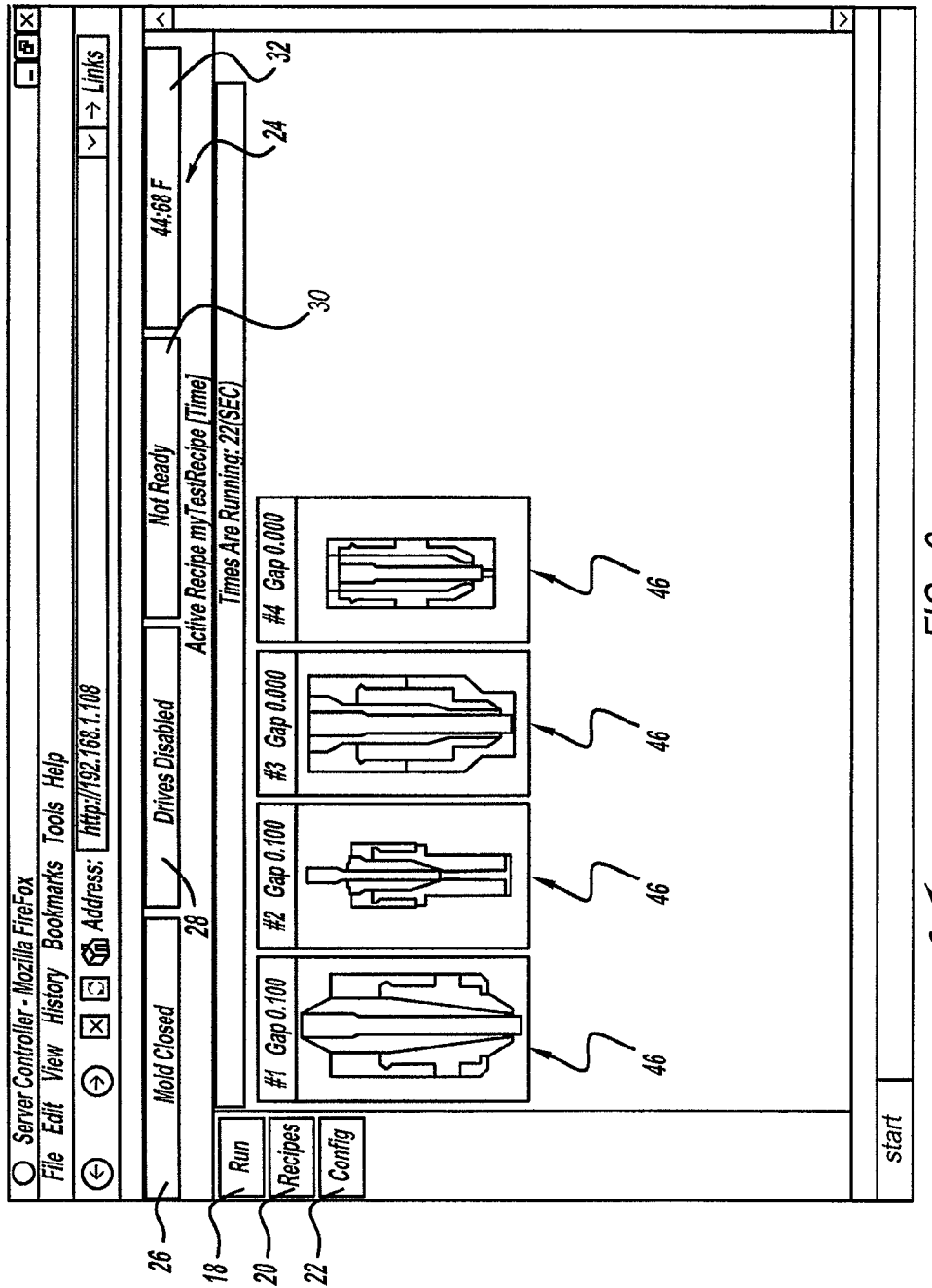
FIG. 3 is a run screen used in a graphical user interface for an injection molding machine having electronic control, according to the present invention.

The Auto Mode 42 is the typical mode of operation, where the gates open and close automatically as defined by the active recipe. As mentioned above, pressing the Run Control button 18 will allow the user to access the run screen, shown in FIG. 3 at 44. The Run Screen 44 shows several icons 46 which represent each of the valve gates.

Figure 4:
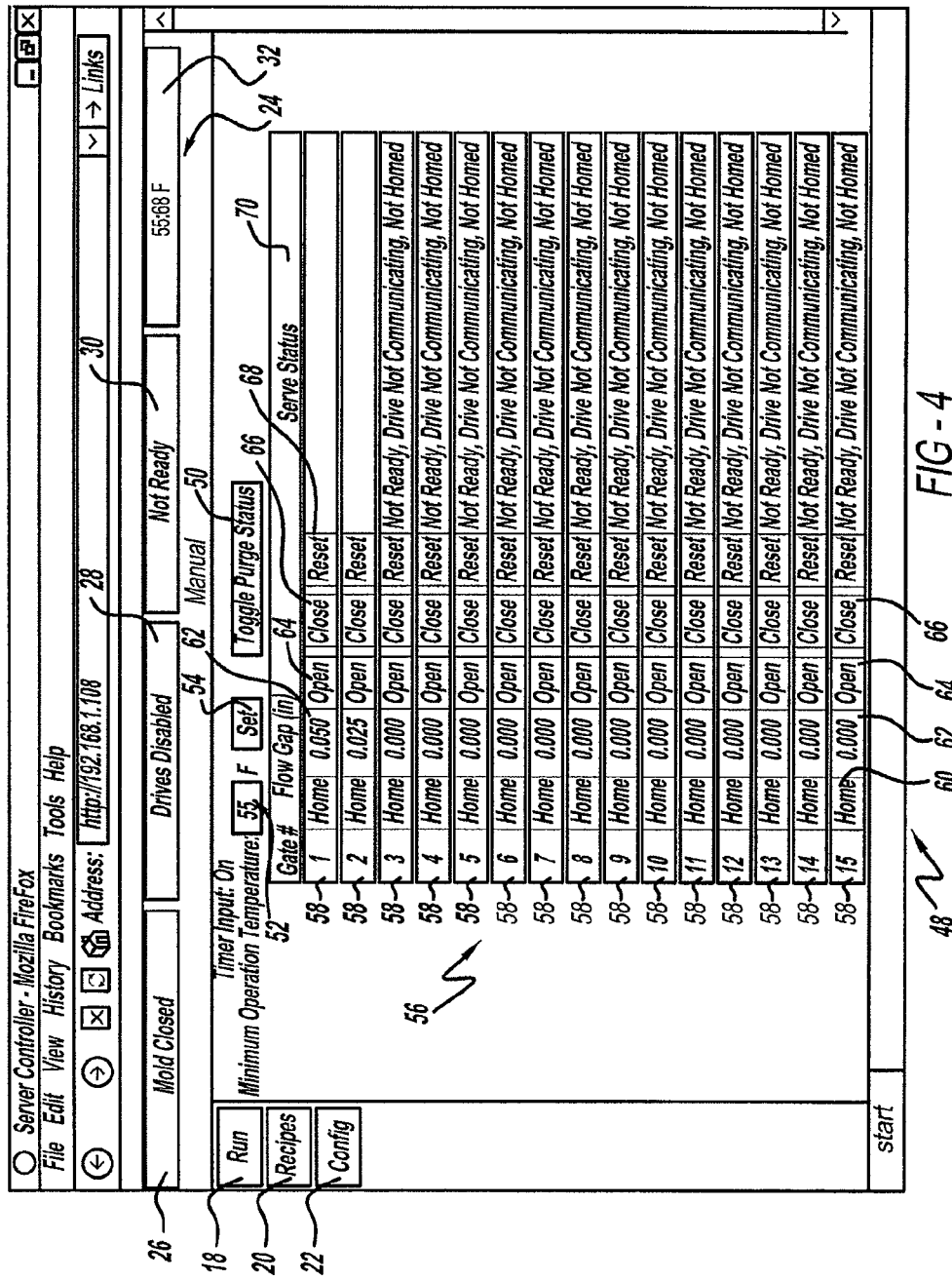
FIG. 4 is a calibration screen used for a graphical user interface for an injection molding machine having electronic control, according to the present invention.

When the Operating Mode 34 that is chosen is the Manual Mode 40 of operation, this allows for manual control over the motion of the valve gates 46 which is most useful in terms of troubleshooting and mold maintenance. If the user selects the Manual Mode 40 of operation from the drop down menu of the Operating Mode 34, the user will be taken to a Manual Mode Screen, generally shown in FIG. 4 at 48. The Manual Mode Screen 48 includes a Toggle Purge Status Button 50, a Minimum Operating Temperature Input field, shown generally at 52, and a Set button 54. There is also a listing, shown generally at 56 for all of the gates. The listing 56 includes the Gate Number 58, the Home button 60, the Flow Gap 62, an Open button 64, a Close button 66, a Reset button 68, and a Servo Status Indication 70.

The Toggle Purge Status button 50 is pressed when it is desired to purge machine and open all the valve gates 46 fully if the tool is above operating temperature. The minimum operating temperature is entered into the Minimum Operating Temperature field 52, and the Set button 54 is pressed to make the value entered into the Minimum Operating Temperature field 52 the minimum operating temperature for the system 10.

When at the Manual Mode Screen 48, the Home button 60 is used to apply the homing force to the pin, the function of which will be described later. The Open button 64 is used for opening the gate, the Closed button 66 is used for closing the gate, and the Reset button 68 is used for resetting the gate to an initial position.

Figure 2:
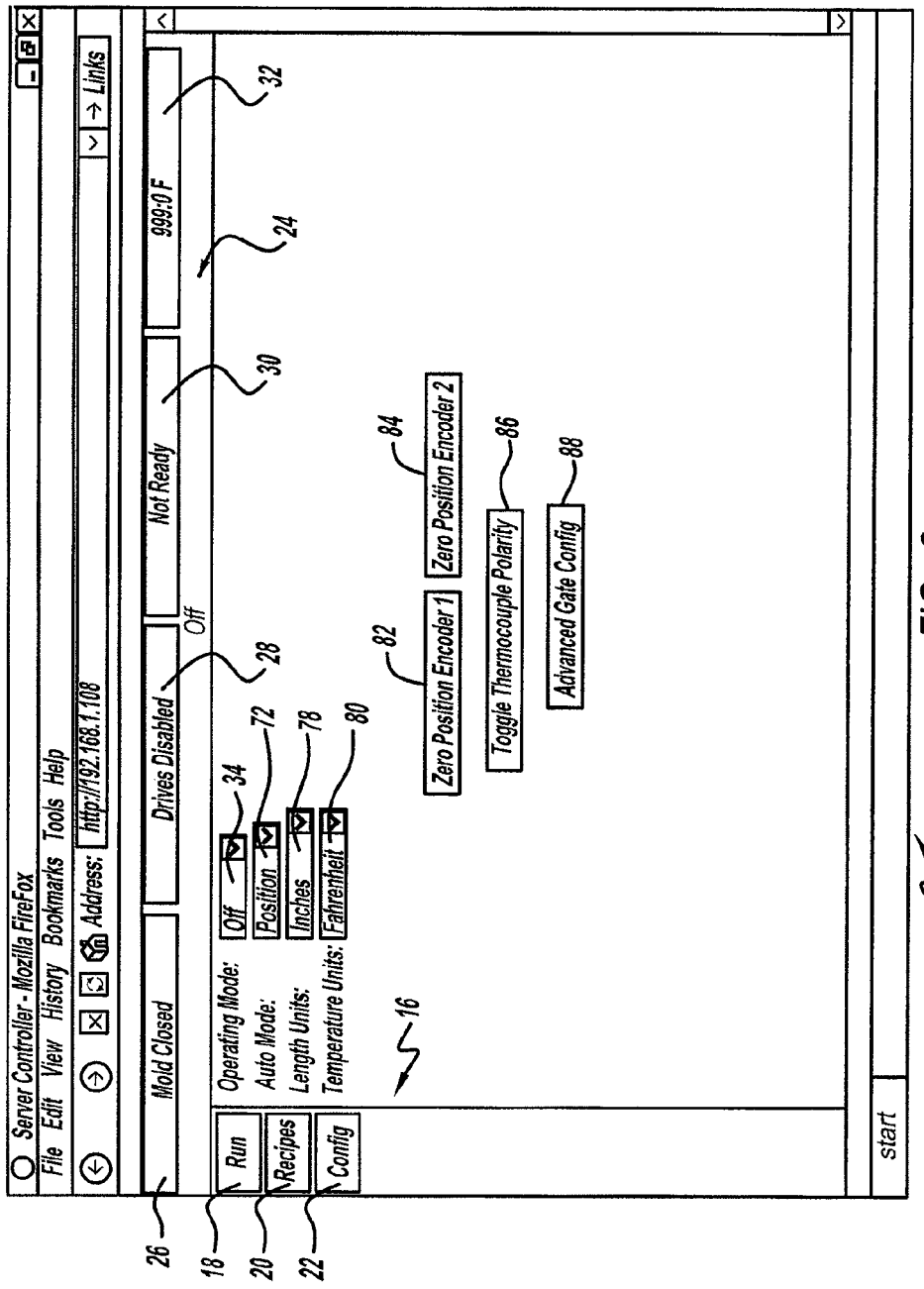
FIG. 2 is a screen shot of a start-up screen used in a graphical user interface for an injection molding machine having electronic control, according to the present invention.

Referring back to FIG. 2, the startup screen 14 also includes an "Auto Mode" field, shown generally at 72, which will only have an effect on the operation of the system 10 when the Operating Mode 34 is set to Auto Mode 42. In this embodiment, the Auto Mode field 72 is a drop down menu, having two choices; they are position 74 and time 76. When position 74 is chosen, movement of the valve gate 46 is triggered by the position of the press screw (the press screw is a device used for driving molten material into the mold, as the molten material is driven toward the mold, the valve gate(s) 46 must be open for the molten material to flow into the mold); when time 76 is selected, movement of the valve gate 46 is triggered by the elapsed time starting when the mold closed 26 input and run timers input (the function of which will be described later) are both active.

The startup screen 14 also includes a Length Units Field, generally shown at 78, a Temperature Units Field, generally shown at 80, a Zero Position Encoder 1 button 82, a Zero Position Encoder 2 button 84, a Toggle Thermocouple Polarity button 86, and an Advanced Gate Config button 88.

The Length Units Field 78 in this embodiment is a drop down menu which allows for the user to select between metric (mm) units 79 or English (inches) units 77 to be used for all length-related parameters and indicators. The Temperature Units Field 80 in this embodiment is also a drop down menu which allows the user to either select metric (° C.) units 85 or English (° F.) units 87 to be selected for all temperature-related parameters and indicators.

There is one button for each press position encoder in the system. In this embodiment, there are two press position encoders used for the system 10 of the present invention, a first Press Position Encoder 81, and a Second Press Position Encoder 83. A press position encoder is a device used for determining the position of a press screw used in an injection molding machine for injecting molten material into a mold. The value assigned to the position of the press screw as the system 10 operates is referred to as the "press position value." The Zero Position Encoder 1 button 82 zeros out the press position value controlled by the first Press Position Encoder 81 (i.e., Position Encoder 1), and the Zero Position Encoder 2 button 84 zeros out the press position value control by the Second Press Position Encoder 83 (i.e., Position Encoder 2). Before a recipe is run, the Position Encoders 81,83 must be reset to zero, or "zeroed out", to ensure that the position of the press screw for the injection molding machine is monitored correctly as a recipe is run. The position of the press screw after the Zero Position Encoder 1 button 82 and the Zero Position Encoder 2 button 84 are pressed is referred to as the "zero press position." The "zero press position" is used as the initial reference point after the press screw begins operation to determine when the valve gates 46 are to open and close.

With regard to the Toggle Thermocouple Polarity button 86, pressing this button 86 will change the polarity of the thermocouple used in the system 10. During installation, the wires for the thermocouple can be installed backwards accidentally. Pressing the Toggle Thermocouple Polarity button 86 has the same effect as swapping the thermocouple wires without actually having to physically swap the connections.

Figure 5:
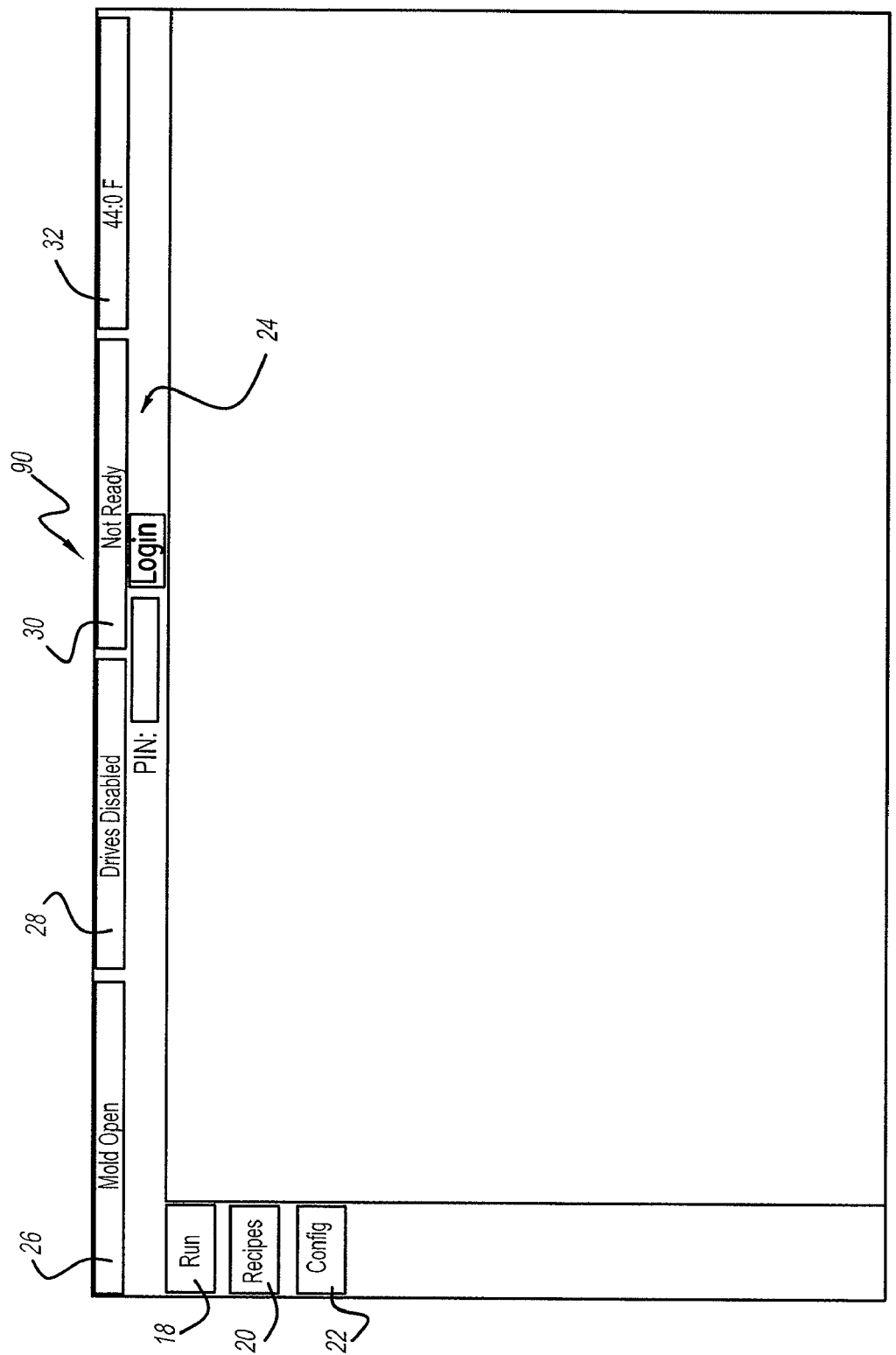
FIG. 5 is a password screen used in a graphical user interface for an injection molding machine having electronic control, according to the present invention.
Figure 6:
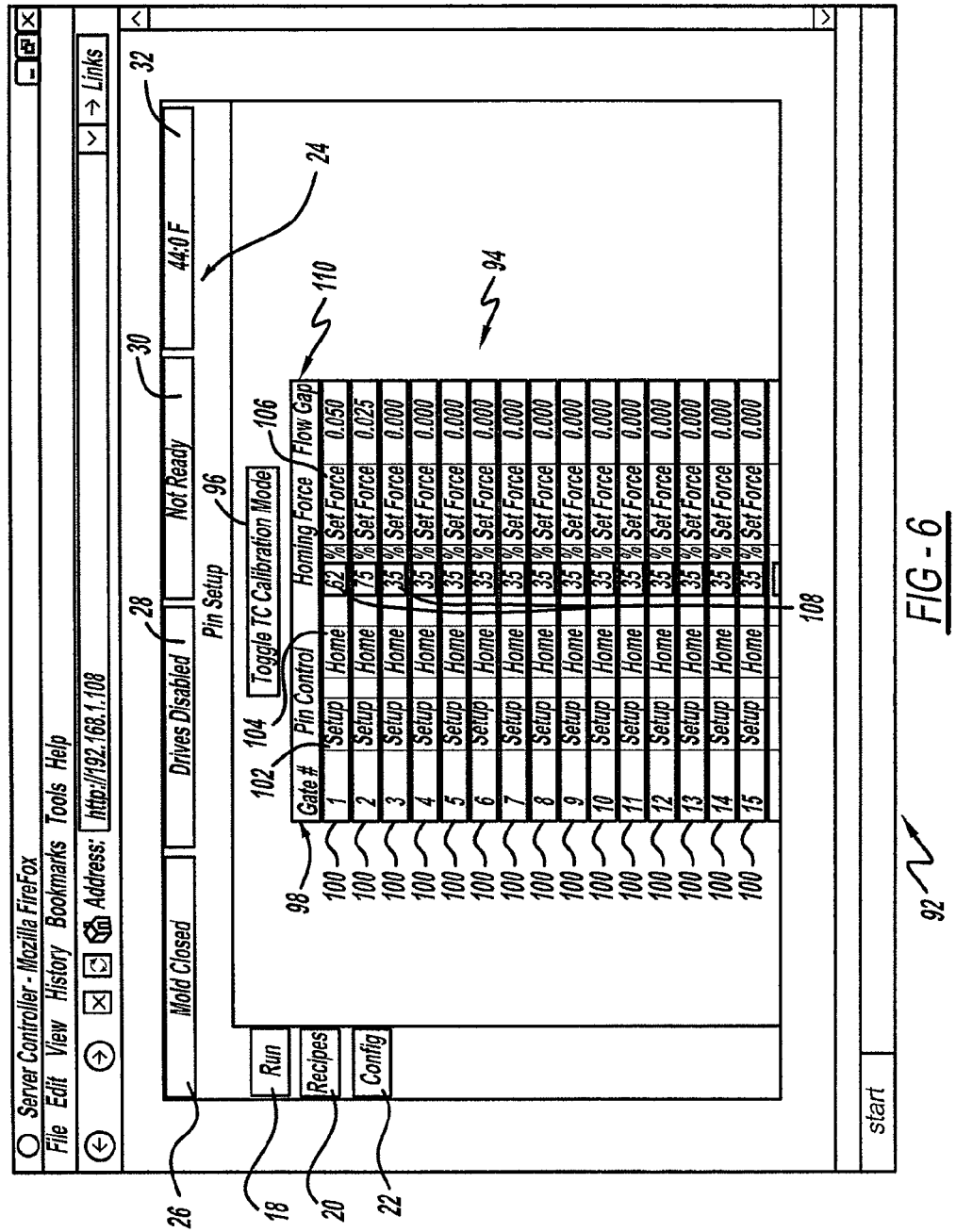
FIG. 6 is a manual run screen used in a graphical user interface for an injection molding machine having electronic control, according to the present invention.

If the Advanced Gate Config button 88 is pressed, the system 10 will bring up a Password Screen, shown generally in FIG. 5 at 90; once the user enters in the proper password, the user will arrive at the Pin Setup Screen shown generally at 92 in FIG. 6. The user will want to access the Pin Setup Screen 92 when performing the pin setup process; the pin setup process is the process of physically attaching the pins for each of the valve gates 46 in the mold to the servo motors. The servo motors are the devices used for moving the pins between an open and closed position and are controlled by the servo drives. There are several Pin Setup buttons 94 included on the Pin Setup Screen 92. There is a Toggle TC Calibration Mode Button 96, which commands the system to go into calibration mode, where the thermocouple circuit (not shown) is calibrated by measuring known reference voltages in a calibration sequence.

The Pin Setup Screen 92 also includes a listing of the gates, shown generally at 98, and each gate having a number 100. Each gate 100 in the listing 98 also has three buttons, a Setup button 102, a Home button 104, and a Set Force button 106. There are also fields for the Homing Force 108, which is expressed as a percentage of the full force, and the Flow Gap 110. As mentioned above, the pin setup process is the process of physically attaching the pins for each of the gates in the mold to the servo motors. The pin setup process can only be performed when the Operating Mode 34 is set to Manual Mode 40, and the user accesses the Pin Setup Screen 92.

When the user is at the Pin Setup Screen 92, the Setup button 102 is pressed to cause the servo motor to go to a specific reference position relative to the end stop position; the pin for the gate is then attached. Once the pins are attached, the Homing button 104 is then pressed, and the pins are then commanded to their closed position. The Homing Force 108 is a percentage of the full force that is applied to the pins to ensure that the pins are flush with the mold when closed. The percentage is entered in the field for the Homing Force 106. Once the percentage is entered, the Set Force button 108 must be pressed to save the value entered into the field for the Homing Force 108. Pin setup allows the torque limit (Homing Force 108) to be set for the servo drive for each gate. When the Homing Force 108 is changed, the gate will calibrate (i.e., finds) the home position again using a new torque limit (which is obtained when the pin is re-seated).

There is a Homing Force 108 which is programmable for each gate 46 in the gate listing 98 that is used in each recipe. As mentioned above, the Homing Force 108 for each gate 46 is the force exerted by the servo motor when homing the pin during the pin setup process and the torque limit during operation, and is a percentage of full force. The default value entered into the field for the Homing Force 108 is 20%; therefore, the default value for the Homing Force 108 is 20% of that of the full force. The range for the Homing Force 108 is between 1 to 100%.

Figure 7:
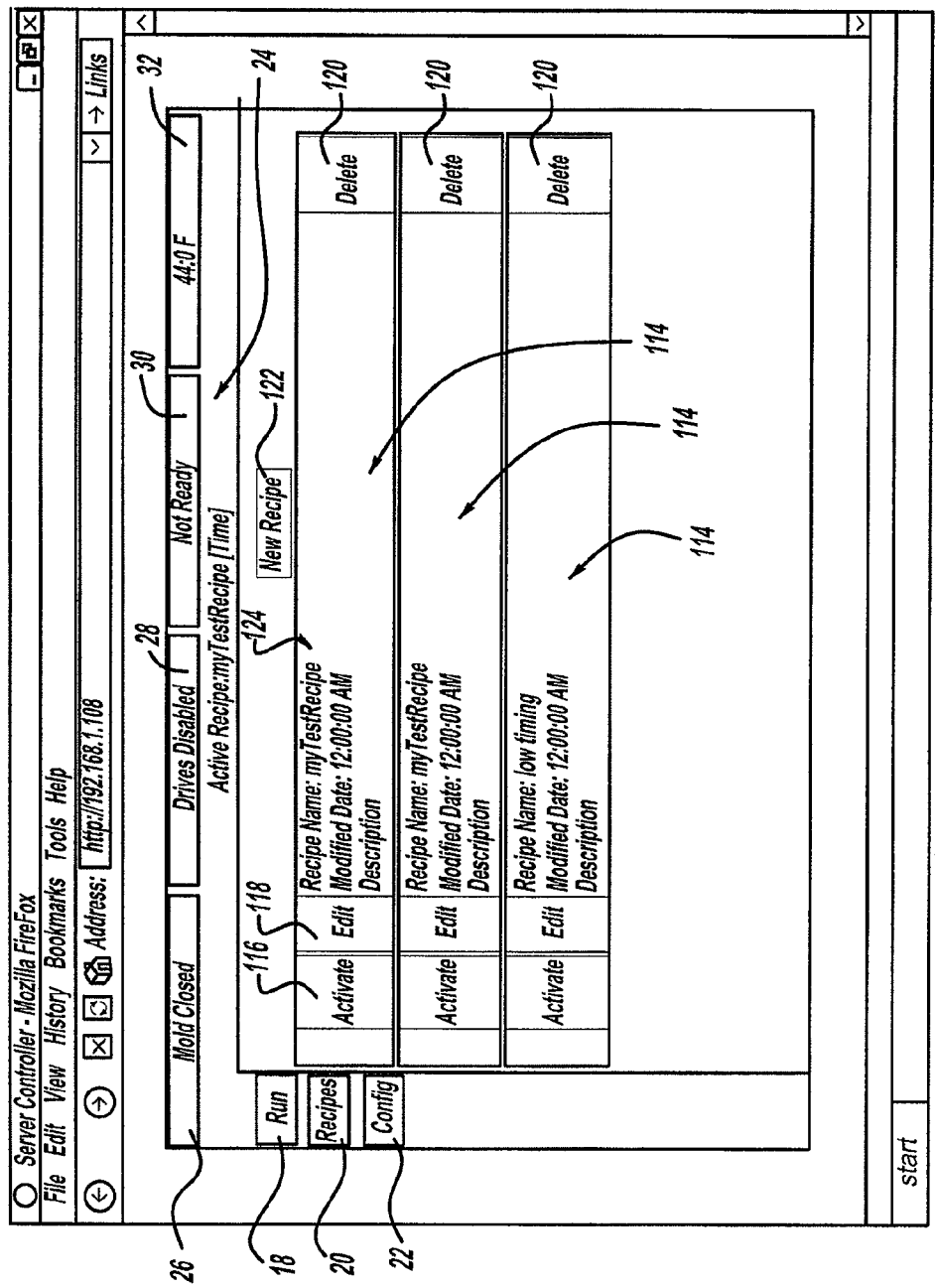
FIG. 7 is a recipe selection screen used in a graphical user interface for an injection molding machine having electronic control, according to the present invention.

Referring back to the Startup Screen 14, if the user presses the Recipe button 20, the user will arrive at the Recipe Selection Screen, generally shown at 112 in FIG. 7. The Recipe Selection Screen 112 allows the user to activate or edit existing recipes, create new recipes, or delete recipes. On the Recipe Selection Screen 112 there are three recipes, shown generally at 114. Each recipe 114 includes several buttons, an Activate button 116, an Edit button 118, and a Delete button 120. There is also a New Recipe button 122, the function of which will be described later. Each recipe 114 also includes a field 124 which includes a description of the recipe 114, if desired, the name of the recipe 114, as well as the date the last time the recipe 114 was modified.

When the user presses the Activate button 116 for a specific recipe 114, that specific recipe 114 will become the current recipe 114 used by the system 10 for operation of the valve gates. Pressing the Delete button 120 deletes the recipe 114. Pressing the Edit button 118 opens the recipe 114 for editing. Each recipe 114 is edited separately, and pressing one of the Edit buttons 118 opens up only one recipe 114 for editing.

Figure 8:
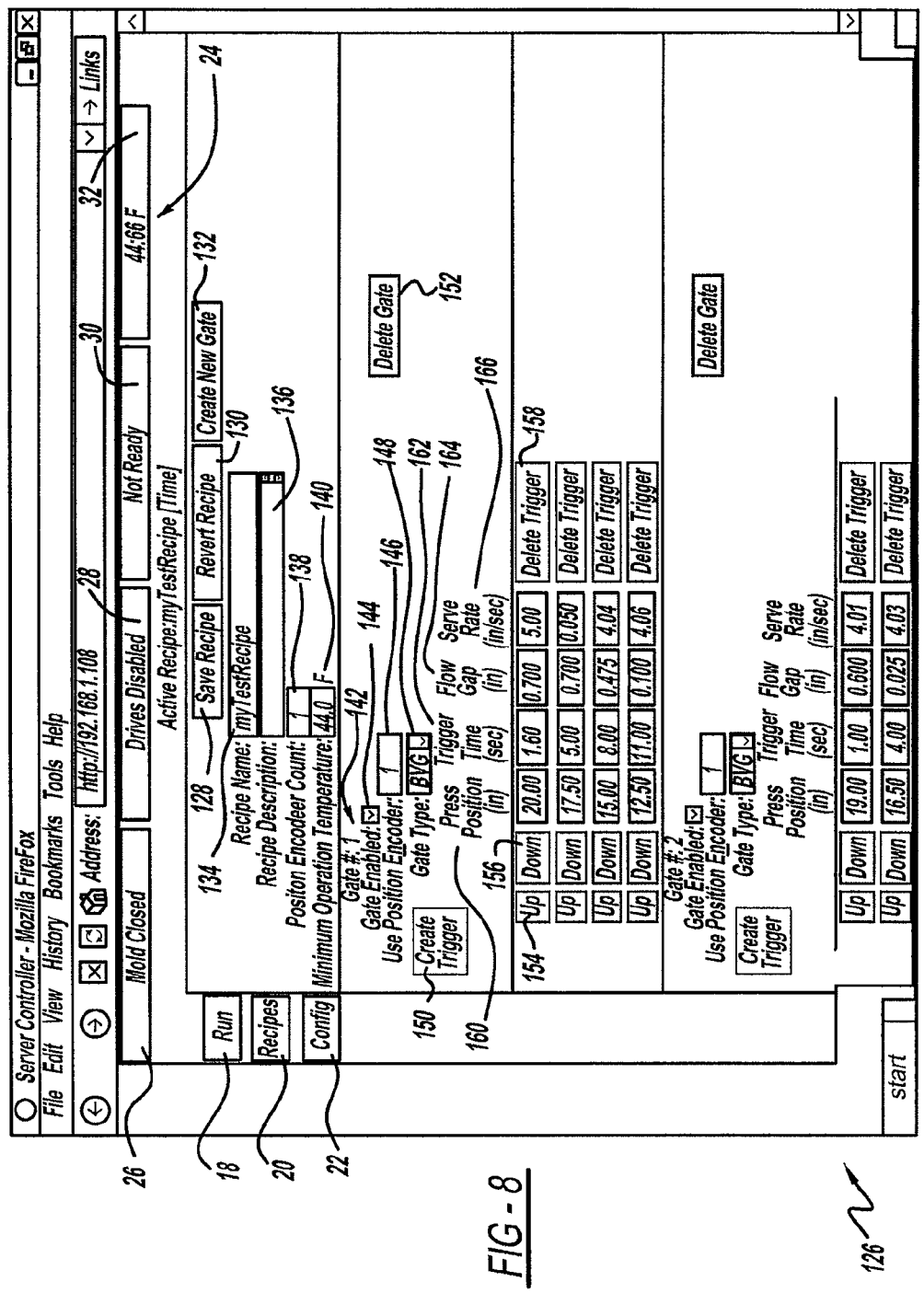
FIG. 8 is a recipe edit screen used in a graphical user interface for an injection molding machine having electronic control, according to the present invention.

Once the recipe Edit button 118 is pressed, the user will arrive at the Recipe Edit Screen, shown generally at 126 in FIG. 8. Each recipe 114 is a group of machine setup parameter values saved together under a user created name so that they can be reloaded for use and/or editing to create a new recipe 114. Each recipe 114 is a record in a database. There are several fields and buttons on the recipe edit screen 126. There is a Save Recipe Button 128, a Revert Recipe Button 130, and a Create New Gate Button 132. The Save Recipe button 128 saves changes to the recipe 114, and the Revert Recipe button 130 cancels any changes made to the recipe 114 and returns all the parameters of the recipe 114 to their last saved values. The Create New Gate button 132 adds the next sequential gate number to the recipe 114 that will be used.

It can be seen in FIG. 8 that the Recipe Selection Screen 126 also has a set of parameters which are chosen for each valve gate 46. In this embodiment, there are two gates shown on the Recipe Selection Screen 126, but it is within the scope of the invention that more or less gates may be used. As mentioned above, the Create New Gate button 132 adds control over the operation of a new gate to the recipe 114; as shown on the screen, there are two gates 46, but if it is desired to add an additional gate 46, the Create New Gate Button 132 is pressed.

There is also a Recipe Name Field 134, a Recipe Description Field 136, a Position Encoder Count Field 138, and a Minimum Operating Temperature Field 140. The Recipe Name field 134 is used for a short label which is used to reference a recipe 114. The Recipe Description field 136 is the field in which the operator is allowed to enter information and various notes pertaining to the recipe 114. The information entered into the Recipe Name field 134 and the Recipe Description field 136 is the information shown in the field 124 on the Recipe Selection Screen 112. The Position Encoder Count field 138 is the number of press position encoders used in a recipe 114; there can be one or two press position encoders, with the default value for the Position Encoder Count field 138 being one.

The Minimum Operating Temperature field 140 is the manifold temperature above which movement of the pin is enabled. The units for this field 140 may be Fahrenheit or Celsius, depending upon the units selected in the Temperature Units field 80 on the Startup Screen 14. When the manifold temperature is below the value entered into the Minimum Operating Temperature field 140, the servo drives are disabled so that the servo motors will not move. The only exception to this is in Pin Setup Mode (where the user has accessed the Pin Setup Screen 92), where the pins are allowed to move regardless of manifold temperature.

There is a Gate Number Indication Field, generally shown at 142, a Gate Enabled Field, generally shown at 144, which in this embodiment is a check box, as well as a Use Position Encoder Field, shown generally at 146, and a Gate Type Field, shown generally at 148.

The Gate Number Indication Field 142 simply identifies the gate 46 by number. The Gate Enabled Field 144 as mentioned above is a check box, and when a new gate 46 is added, the check box is checked by default, meaning that when a new gate 46 is added to a recipe 114, the gate 46 will be enabled by default.

The Use Position Encoder Field 146 is assigned a default value of one, but may also have a value of two because there are two possible press position encoders that can be assigned to each valve gate 46 in the recipe 114 (which is also why there is also a Zero Position Encoder One Button 82 and a Zero Position Encoder Two Button 84). By way of explanation but not limitation, if Press Position Encoder Two (the second Press Position Encoder 83) is assigned to the fifth gate in the seventh Recipe, then all press position triggers in the seventh recipe for fifth gate use Press Position Encoder Two.

The Gate Type Field 148 in this embodiment is a drop-down menu where the type of gate 46 is selected. This Field 148 determines the particular graphic that will be used on the Run Screen 44 for the gate 46 when the recipe 114 is running. The Run Screen 44 displays several different types of graphics that are used to show the various types of gates 46 being used for a particular recipe 114.

There are also several buttons used for defining the parameters of each gate 46; there are three "gate parameters" and a list of "trigger parameters." As mentioned above, a valve gate 46 is a device used for allowing or preventing the flow of molten material into a mold. A "trigger parameter" or "trigger point" is a point where the operation of the valve gate 46 changes. There are up to 256 trigger points that can be defined for each gate 46. For each gate 46 there is a Create Trigger Button 150, and a Delete Gate Button 152. Each trigger also has several buttons and fields, there is an Up Button 154, a Down Button 156, and a Delete Trigger Button 158. The Up Button 154, Down Button 156, and Delete Trigger Button 158 are used in conjunction with the fields; they are a Press Position Field, generally shown at 160, a Trigger Time Field, generally shown at 162, a Flow Gap Field, generally shown at 164, and a Servo Rate Field, generally shown at 166.

The Create Trigger Button 150 adds a new line to the trigger list of each gate 46. The Up Button 154 moves a trigger up one position on the list, and the Down Button 156 moves a trigger down one position on the list. The Delete Trigger Button 158 deletes a trigger from the list.

As mentioned above, the point at which operation of the gate 46 changes is referred to as a "trigger point." The trigger points can be based on either the position of the press screw in the machine 174, or time. This decision is made when the user selects either Position 74 or Time 76 from the Auto Mode field 72. There are as many trigger points as necessary to properly perform the operation of gate 46. If Position 74 is chosen from the Auto Mode field 72, then the Press Position Field 160 will be used to determine the position of the gates during the operation of the machine 10. Conversely, if Time 76 is chosen from the Auto Mode field 72, the Trigger Time field 162 is used to determine the position of the gates during the operation of the machine 10.

The Press Position Field 160 is the trigger parameter which is the press position value of the press screw at which to start a movement of a valve gate 46 to an associated Flow Gap 164. A flow gap is the amount of space created when the pin of the gate 46 is opened to allow molten material to flow through the gate 46. The value entered into the field for the Flow Gap 164 will be the distance the gate 46 is opened. The value entered into the field for the Flow Gap 164 is the same value used for the Flow Gap 62 on the Manual Mode screen 48 and the Flow Gap 110 on the Pin Setup Screen 92. The values entered into the Press Position Field 160 are continuously compared to the present value of the assigned press position encoder 81,83 to determine when the trigger point is reached at which point the pin will change position to the next Flow Gap 62,110. The values entered into the Press Position Field 160 are only used in Auto Position mode (when the Operating Mode 34 is selected to be Auto Mode 42, and the Auto Mode Field 72 is set to "Position" 74). The default value for the Press Position Field 160 is 0.00 inches. The range is ±60.00 inches, or ±1500.0 mm. However, in the Field 160 itself, the decimal point is only for display purposes; the values are fixed decimal point, no floating, so for inches the values are really ±6000, and for millimeters they are ±15000.

Referring to FIG. 1E, the present invention also includes a device for functioning as a data bank (for storing information, such as information relating to recipes 114 and other machine setup parameters), such as a computer 168 having a display 170. The computer 168 is also connected to a controller 172, which in this embodiment is a low-level controller 172 which includes an Input-Output Printed Circuit Board (IOPCB). The controller 172 receives commands from the computer 168, and then sends a signal to command the injection molding machine 174 to perform the desired operation of the valve gates 46 having the pins. Even though the movement of the pins used in the gates 46 is measured in inches or millimeters, the computer 168 measures the movement in "pulses." When performing calculations and data storage, the computer 168 must always convert the values to pulses for control use and storage of the data for the recipe 114. In this embodiment, when position 74 is being used as the trigger point, and Press Position Field 160 is also being used, the position encoders 81,83 will generate two-hundred pulses per inch of movement of the pin. Therefore, in order to convert the movement of the pin measured in inches to pulses, the distance the pin moves measured in inches is multiplied by two-hundred. For example, movement of one-and-a-half inches would be the equivalent of three-hundred pulses.

If millimeters are the units being used, the conversion factor from millimeters to pulses is accomplished by multiplying the number of millimeters by one thousand, and then dividing by one-hundred-twenty-seven. It should be noted that there are several points or steps in the process where the operation of the machine 174 changes based on the recipe 114 and how the material is to be injected into the mold. When the controller 172 seeks another command, and the last trigger point has been reached, the computer 168 will respond with a default value, meaning that the last trigger point has been requested, and the valve gate 46 should not make any more movements in the cycle.

As described above, there are two modes of operation that can be selected from the Auto Mode field 72, they are position 74 and time 76. When time 76 is selected, there various timers, or "Run Timers" 176, which are activated once the machine 10 begins operation (more specifically, when the press screw begins to move after being in its initial position). The Trigger Time Field 162 is the parameter which is the time measured in seconds to wait from the time that the Run Timers 176 input is activated before starting movement of a valve gate 46 to the associated Flow Gap 62,110. Once again, the Triggers Time field 162 is only used in Auto Time mode (when the Operating Mode 34 is selected to be Auto Mode 42, and the Auto Mode Field 72 is set to "Time" 76). The default value in the Trigger Time Field 162 is zero. The ranges of values that may be entered into the field are from 0.00 to 99.99 seconds. Once again, there are as many trigger points as necessary (up to 256) to properly perform the operation of the gate 46. When the controller 172 seeks another command, and the last trigger point has been reached, the computer 168 will respond with a default value, meaning that the last trigger point has been requested, and the valve gate should not make any more movements in the cycle.

The Flow Gap Field 164 is used for displaying a value; for each Press Position 160 or Elapsed Time Trigger 162 there is an associated Flow Gap Field 164. As mentioned above, the value shown in the Flow Gap Field 164 is the same value used for the Flow Gap 62 in the Manual Mode Screen 48, and the same value as the Flow Gap 110 shown in the Pin Setup Screen 92. The Flow Gap 62,110 is the position the pin is moved to relative to a fully closed valve gate 46. The value in the Field 164 when the valve is fully closed is zero, and the range for the Field 164 is from 0.000 inches to 0.750 inches, or from 0.00 mm to 19.00 mm. When the system 10 is using trigger points for a gate, the value in the Field 164 for the Flow Gap 62,110 must be in thousandths of an inch. The Flow Gap 62,110 value used by the software of the system 10 and the gates is always in thousandths of an inch, so the computer 168 must convert any measurements in millimeters to thousandths of an inch before they can be used.

The Servo Rate Field 166 is the field in which a value for the Servo Rate is entered. For each Press Position Trigger 160 or Elapsed Time Trigger 162, there is an associated Servo Rate 166. The Servo Rate 166 is the rate (or speed) in which the pin moves such that the gate 46 is at the specified Flow Gap 62,110. The range for the Servo Rate 166 is 0.01 inches/sec to 5.00 inches/sec, or 0.3 mm/sec to 127.0 mm/sec.

After each recipe 114 is completed, the user can simply press the Save Recipe button 128 to save the changes made set forth in the manner above, if any, made to the recipe 114. If the user does not want to save any of the changes made, the user will simply press the Revert Recipe button 130 to restore the various parameters of the recipe 114 to the last set of saved parameters. Once the user has decided whether or not to save the recipe 114, the user may press the Activate button 116 to make a specific recipe 114 the recipe that will be run by the system 10. Once a specific recipe 114 is activated, the Run button 18 is pressed to activate the system 10, and view the Run Screen 44. The user may also, once at the Run Screen 44, touch any one of the gates 46 to monitor a specific gate 46 and view the various operating parameters for each gate 46.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for electronically controlling the movement of pin assembly for a valve gate mechanism of an injection molding machine, comprising:
   at least one valve being part of said injection molding machine;
   a graphical user interface operable for controlling said at least one valve of said injection molding machine;
   said at least one valve of said injection molding machine is controlled electronically
   a plurality of parameters comprising a plurality of trigger parameters;
   a press screw operable for moving molten material through said at least one valve into a mold based on said plurality of trigger parameters;
   one of said plurality of trigger parameters further comprising a press position, and another of said plurality of trigger parameters further comprising a flow gap, wherein the position of said valve is changed such that said at least one valve has said flow gap when said press screw is moved to said press position.

2. The system for electronically controlling the movement of pin assembly for a valve gate mechanism of an injection molding machine of claim 1, further comprising a plurality of operating parameters for electronically controlling said at least one valve.

3. The system for electronically controlling the movement of pin assembly for a valve gate mechanism of an injection molding machine of claim 2, said plurality of parameters further comprising at least one recipe.

4. The system for electronically controlling the movement of pin assembly for a valve gate mechanism of an injection molding machine of claim 3, said at least one recipe further comprising multiple recipes.

5. The system for electronically controlling the movement of pin assembly for a valve gate mechanism of an injection molding machine of claim 1, said press position further comprising a specific position of said press.

6. The system for electronically controlling the movement of pin assembly for a valve gate mechanism of an injection molding machine of claim 1, further comprising at least one position encoder operable for detecting the position of said press, said press position encoder operable with said graphical user interface for aiding in the control of said at least one valve.

7. The system for electronically controlling the movement of pin assembly for a valve gate mechanism of an injection molding machine of claim 1, further comprising multiple modes of operation, said multiple modes of operation being one selected from the group consisting of an off mode, an auto mode, and a manual mode.

8. The system for electronically controlling the movement of pin assembly for a valve gate mechanism of an injection molding machine of claim 1, said graphical user interface further comprising a touch screen.

9. The system for electronically controlling the movement of pin assembly for a valve gate mechanism of an injection molding machine of claim 8, further comprising:
 a controller operable with said graphical user interface for receiving commands from said graphical user interface, and transmitting said commands to said injection molding machine; and
 a display, said touch screen operable with said display for allowing said user to send commands to said controller.

10. The system for electronically controlling the movement of pin assembly for a valve gate mechanism of an injection molding machine of claim 9, said controller further comprising a low-level controller.

11. The system for electronically controlling the movement of pin assembly for a valve gate mechanism of an injection molding machine of claim 1, said plurality of parameters further comprising one or more recipes.

12. The system for electronically controlling the movement of pin assembly for a valve gate mechanism of an injection molding machine of claim 11, said one or more recipes further comprising said plurality of trigger parameters.

13. The system for electronically controlling the movement of pin assembly for a valve gate mechanism of an injection molding machine of claim 12, said plurality of trigger parameters further comprising:
 a specific amount of time that the press screw has moved in said injection molding machine; and
 wherein said press position is the position of said press screw in said injection molding machine.

14. The system for electronically controlling the movement of pin assembly for a valve gate mechanism of an injection molding machine of claim 1, further comprising a press position encoder, said press position encoder used for determining a position of said press screw when the position of said at least one valve changes based on said press position.

15. The system for electronically controlling the movement of pin assembly for a valve gate mechanism of an injection molding machine of claim 1, said injection molding machine further comprising multiple modes of operation, said multiple modes of operation being one selected from the group consisting of an off mode, an auto mode, and manual mode.

16. The system for electronically controlling the movement of pin assembly for a valve gate mechanism of an injection molding machine of claim 1, further comprising:
 a controller operable with said graphical user interface for sending commands to said injection molding machine;
 a display operable with said graphical user interface and said controller; and
 said graphical user interface further comprising a touch screen operable with said display for allowing a user to send commands to said controller through said touch screen.

17. A system for electronically controlling the movement of pin assembly for a valve gate mechanism of an injection molding machine comprising:
 at least one valve being part of said injection molding machine, said injection molding machine having a press screw for delivering molten material through said at least one valve into a mold based on a plurality of trigger parameters;
 a graphical user interface operable for controlling said at least one valve of said injection molding machine;
 a plurality of parameters comprising said plurality of trigger parameters, said plurality of parameters operable with said graphical user interface for sending commands to said injection molding machine; and
 wherein said at least one valve of said injection molding machine is controlled electronically;
 one of said plurality of trigger parameters further comprising a specific amount of time, and another of said plurality of trigger parameters further comprising a flow gap, wherein the position of said valve is changed such that said at least one valve has said flow gap when said press screw has been moving for said specific amount of time.

18. A method for controlling the opening and closing of a valve used in an injection molding machine, comprising the steps of:
 providing an injection molding machine;
 providing at least one valve gate used with said injection molding machine;
 providing a plurality of parameters comprising one or more recipes, said one or more recipes comprising a plurality of trigger parameters;
 providing a press screw operable for moving molten material through said at least one valve into a mold based on said plurality of trigger parameters;
 providing a graphical user interface between a user and said injection molding machine; and
 electronically controlling said at least one valve gate with said graphical user interface;
 wherein said plurality of trigger parameters comprises the steps of:
  providing a press position, said press position is the position of said press screw in said injection molding machine;
  providing a specific amount of time that the press screw has moved in said injection molding machine; and
  providing a flow gap, wherein said at least one valve is positioned to have said flow gap such that said molten material will flow through said flow gap, and said at least one valve will move to create said flow gap when said press screw is in said press position or said press screw has been operating for said specific amount of time.

19. The method of claim 18, further comprising the steps of:
 providing a controller, said controller operable with said graphical user interface for controlling said injection molding machine.

20. The method of claim 18, further comprising the steps of providing a touch screen, said touch screen being part of said graphical user interface.

21. The method of claim 18, further comprising the steps of selecting the mode of operation of said injection molding machine from the group consisting of an off mode, an automatic control mode, and a manual control mode.

22. The method of claim 18, further comprising the steps of:
 providing at least one press position encoder; and
 measuring a change in position of said press screw using said press position encoder.

23. The method of claim 18, further comprising the steps of:
Providing a group of specific parameters for the operation of said at least one valve.

24. The method of claim 23, further comprising the step of said group of specific parameters being referred to as a recipe.

25. The method of claim 24, further comprising the steps of:
providing multiple recipes for controlling said injection molding machine;
providing said at least one valve gate to further include multiple valve gates;
controlling the operation of said multiple valve gates through the use of said multiple recipes; and
interacting with said multiple recipes through the use of said graphical user interface.

26. The method of claim 18, further comprising the steps of:
providing a controller operable for controlling said at least one valve gate and said injection molding machine; and
providing a display having a touch screen as part of said graphical user interface, said touch screen allowing a user to provide commands to said controller.

\* \* \* \* \*